United States Patent
Kwon

(10) Patent No.: US 11,373,412 B2
(45) Date of Patent: Jun. 28, 2022

(54) OBSTACLE MAP GENERATING METHOD AND APPARATUS

(71) Applicant: HANWHA DEFENSE CO., LTD., Changwon-si (KR)

(72) Inventor: Min Hyeok Kwon, Changwon-si (KR)

(73) Assignee: HANWHA DEFENSE CO., LTD., Changwon-si (KR)

(*) Notice: Subject to any disclaimer, the term of this patent is extended or adjusted under 35 U.S.C. 154(b) by 277 days.

(21) Appl. No.: 16/563,165

(22) Filed: Sep. 6, 2019

(65) Prior Publication Data

US 2020/0265248 A1   Aug. 20, 2020

(30) Foreign Application Priority Data

Feb. 14, 2019 (KR) .......................... 10-2019-0016993

(51) Int. Cl.
*G06V 20/58* (2022.01)
*G05D 1/02* (2020.01)
*G01C 21/00* (2006.01)

(52) U.S. Cl.
CPC ......... *G06V 20/58* (2022.01); *G01C 21/3804* (2020.08); *G05D 1/0214* (2013.01); *G05D 1/0274* (2013.01); *G05D 1/0221* (2013.01)

(58) Field of Classification Search
CPC ............. G06K 9/00805; G05D 1/0214; G05D 1/0221; G05D 1/0274; G01C 1/3804
See application file for complete search history.

(56) References Cited

U.S. PATENT DOCUMENTS

| | | | |
|---|---|---|---|
| 7,953,551 B2 | 5/2011 | Park et al. | |
| 8,594,370 B2* | 11/2013 | Schamp | G06K 9/00805 382/103 |
| 9,135,798 B2* | 9/2015 | Sakagami | G06K 9/00805 |
| 9,417,070 B1* | 8/2016 | Herriot | G01C 21/00 |
| 11,003,188 B2* | 5/2021 | Scott | G05D 1/0274 |
| 11,016,491 B1* | 5/2021 | Millard | G05D 1/0274 |
| 2006/0149465 A1* | 7/2006 | Park | G05D 1/0274 701/416 |
| 2008/0027591 A1* | 1/2008 | Lenser | G05D 1/0297 701/28 |

(Continued)

FOREIGN PATENT DOCUMENTS

JP   2007-122304 A   5/2007
KR   10-2011-0026776 A   3/2011

(Continued)

*Primary Examiner* — Dale W Hilgendorf
(74) *Attorney, Agent, or Firm* — Sughrue Mion, PLLC

(57) ABSTRACT

A method for generating an obstacle map is provided. The method includes: receiving an environment map; generating a binary map indicating a position of an obstacle by a value of an obstacle cost corresponding to a probability of presence of the obstacle at the position, based on obstacle information obtained from the environment map; and generating an obstacle map by applying an obstacle expansion model to the binary map, wherein the applying the obstacle expansion model comprises setting a plurality of obstacle costs of a plurality of neighboring positions of the position of the obstacle in the binary map to a plurality of values, respectively. Accordingly, a safer and stable route can be generated to avoid the obstacle.

20 Claims, 7 Drawing Sheets

(56) References Cited

U.S. PATENT DOCUMENTS

| | | | |
|---|---|---|---|
| 2011/0052043 A1* | 3/2011 | Hyung | G05D 1/0274 |
| | | | 382/154 |
| 2012/0158178 A1* | 6/2012 | Hyung | G05D 1/0274 |
| | | | 901/46 |
| 2014/0309841 A1* | 10/2014 | Hara | G05D 1/0274 |
| | | | 701/26 |
| 2016/0282870 A1* | 9/2016 | Yamamura | G05D 1/0265 |
| 2017/0199525 A1* | 7/2017 | Albaghajati | G05D 1/0274 |
| 2017/0344007 A1* | 11/2017 | Song | G05D 1/0274 |
| 2018/0012494 A1* | 1/2018 | Walessa | G06K 9/00805 |
| 2018/0074201 A1* | 3/2018 | Sakai | G01S 13/931 |
| 2018/0107226 A1* | 4/2018 | Yang | G05D 1/0274 |
| 2018/0211103 A1* | 7/2018 | Sohn | G05D 1/024 |
| 2018/0246520 A1* | 8/2018 | Martinson | G05D 1/0094 |
| 2018/0261111 A1* | 9/2018 | Rutkiewicz | G01S 17/89 |
| 2018/0314265 A1* | 11/2018 | Matsuno | B25J 5/007 |
| 2018/0339710 A1* | 11/2018 | Hashimoto | G05D 1/0212 |
| 2018/0362030 A1* | 12/2018 | Ohl | G05D 1/0214 |
| 2019/0094876 A1* | 3/2019 | Moore | B25J 9/1666 |
| 2019/0122037 A1* | 4/2019 | Russell | G06V 20/58 |
| 2020/0150666 A1* | 5/2020 | Scott | G05D 1/0214 |
| 2020/0183408 A1* | 6/2020 | Tajeddin | G01S 17/931 |
| 2021/0103285 A1* | 4/2021 | Philbin | G01S 17/931 |
| 2021/0356972 A1* | 11/2021 | Kwon | G05D 1/0287 |

FOREIGN PATENT DOCUMENTS

| | | |
|---|---|---|
| KR | 10-2012-0013057 | 2/2012 |
| KR | 10-2012-0054879 A | 5/2012 |
| KR | 10-2013-0112507 A | 10/2013 |
| KR | 10-2018-0083580 A | 7/2018 |

* cited by examiner

OBSTACLE MAP GENERATING METHOD AND APPARATUS

CROSS-REFERENCE TO THE RELATED APPLICATION

This application claims priority from Korean Patent Application No. 10-2019-0016993, filed on Feb. 14, 2019, the disclosure of which is incorporated herein by reference in its entirety.

BACKGROUND

1. Field

Apparatuses and methods consistent with exemplary embodiments of the inventive concept relate to obstacle map generation, and more particularly, to generating an obstacle map by expanding an obstacle cost to create a safe route.

2. Description of the Related Art

Recently, research has been conducted on robotic technology to utilize mobile platforms such as unmanned vehicles for tasks that are difficult for humans to carry out. When using a mobile platform such as an unmanned vehicle, autonomous travel is needed so that the mobile platform can move to its destination by itself. Obstacle avoidance is crucial in generating a route for autonomous driving. When planning a route, even roads that a vehicle can actually pass through may not be able to be passed through if a determination is made as to whether the vehicle is to collide with an obstacle simply by enlarging the vehicle or the obstacle on an obstacle map. Also, if a shortest route to avoid the obstacle is generated by using a current environment map, the vehicle may collide with the obstacle due to various error factors such as error in the position of the vehicle during autonomous driving, error in sensing the obstacle in the environment map, and error in following the generated route. In order to prevent this and other problems and create a natural route, it is necessary to create a route that can avoid an obstacle at an appropriate distance from the obstacle.

Information disclosed in this Background section has already been known to the inventors before achieving the disclosure of the present application or is technical information acquired in the process of achieving the disclosure. Therefore, it may contain information that does not form prior art that is already known to the public.

SUMMARY

Various embodiments of the inventive concept provide a method of generating an obstacle map by expanding an obstacle cost of a position of an obstacle in a map, thereby to generate a safer route for a mobile platform.

The embodiments also provide an obstacle map generating apparatus which can generate an obstacle map by expanding the obstacle cost.

According to embodiments, there is provided a method for generating an obstacle map which may include: receiving an environment map; generating a binary map indicating a position of an obstacle by a value of an obstacle cost corresponding to a probability of presence of the obstacle at the position, based on obstacle information obtained from the environment map; and generating an obstacle map by applying an obstacle expansion model to the binary map, wherein the applying the obstacle expansion model comprises setting a plurality of obstacle costs of a plurality of neighboring positions of the position of the obstacle in the binary map to a plurality of values, respectively.

The generating the binary map may include: dividing the environment map into a plurality of grid cells; and setting an obstacle cost of each of the grid cells, corresponding to a probability of presence of the obstacle at each of the grid cells, to a value of 0 or 1, or an equivalent value. The method may further include: setting an obstacle cost of a grid cell having a probability of presence of the obstacle higher than or equal to a reference value to the value of 1; and setting an obstacle cost of a grid cell having a probability of presence of the obstacle lower than the reference value to the value of 0.

The obstacle expansion model may be a model that gradually decreases the obstacle cost of each of the grid cells in a direction away from a grid cell where an obstacle cost is set to the value of 1 in the binary map, and may use at least one of a sigmoid function, a linear function, and a Gaussian function.

The generating the binary map may include, if the obstacle is a dynamic obstacle which is moving, generating the binary map using vector information about the dynamic obstacle, and may further include: obtaining an estimated move area of the dynamic obstacle using at least one of a current position, a moving direction, and moving speed of the dynamic obstacle; calculating an estimated time-to-collision of a mobile platform with the dynamic obstacle; and generating the binary map using an estimated move section, in the estimated move area, of the dynamic obstacle at the estimated time-to-collision with the dynamic obstacle. The generating the obstacle map may include generating the obstacle map by applying the obstacle expansion model to the binary map in consideration of the estimated move area of the dynamic obstacle, and may further include setting obstacle costs of a plurality of estimated move sections, in the estimated move area, of the dynamic obstacle that correspond to a same time to a same value.

According to embodiments, there is provided an obstacle map generating apparatus which may include: a receiver configured to receive an environment map; a memory configured to store an obstacle map generating program which generates an obstacle map from the environment map; and at least one processor configured to execute the obstacle map generating program, wherein the obstacle map generating program is configured to generate a binary map indicating a position of an obstacle by a value of an obstacle cost corresponding to a probability of presence of the obstacle at the position, based on obstacle information obtained from the environment map, and generate an obstacle map by applying an obstacle expansion model to the binary map, and wherein the obstacle expansion model is applied such that a plurality of obstacle costs of a plurality of neighboring positions of the position of the obstacle in the binary map are set to a plurality of values, respectively.

According to the above and other embodiments, a safer and stable route for a mobile platform to avoid an obstacle can be generated. Also, a route for the mobile platform to stably avoid any dynamic obstacle can be generated, and a collision warning can be issued.

BRIEF DESCRIPTION OF THE DRAWINGS

The above and other embodiments and features of the present disclosure will become more apparent by describing in detail embodiments thereof with reference to the attached drawings, in which.

DETAILED DESCRIPTION

Figure 1:
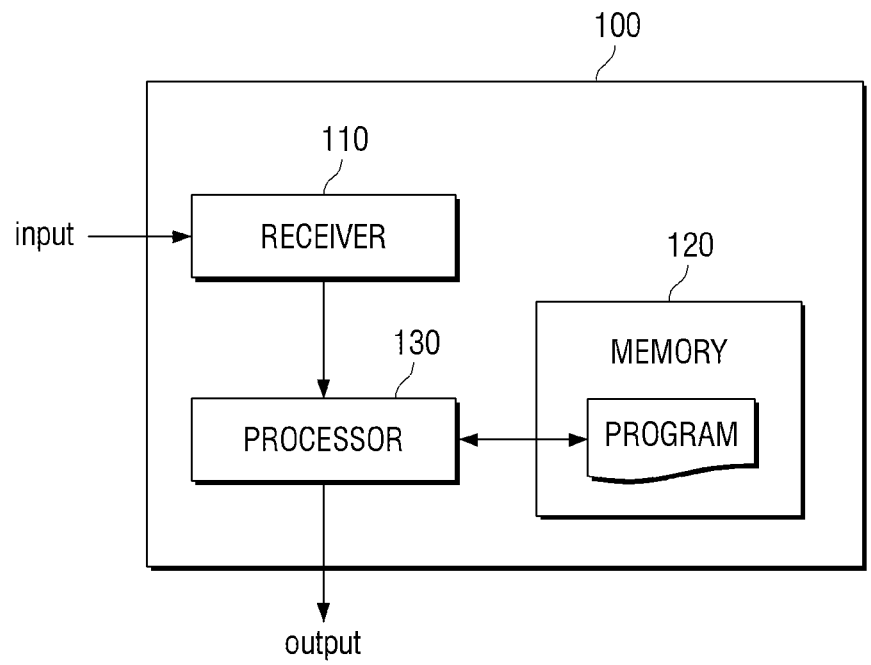
FIG. 1 is a block diagram of an obstacle map generating apparatus according to an embodiment.

Advantages and features of the inventive concept and methods of accomplishing the same may be understood more readily by reference to the following detailed description of embodiments and the accompanying drawings. The embodiments described herebelow are all exemplary, and thus, the inventive concept is not limited to these embodiments disclosed below and may be realized in various other forms. Rather, these embodiments are provided so that this disclosure will be thorough and complete and will fully convey the inventive concept to those skilled in the art, and the inventive concept will only be defined within the scope of the appended claims. Like reference numerals indicate like elements throughout the present disclosure.

Unless otherwise defined, all terms (including technical and scientific terms) used herein have the same meaning as commonly understood by one of ordinary skill in the art to which the embodiments belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The terms and words used in the following description and claims are not limited to the bibliographical meanings, but, are merely used by the inventors to enable a clear and consistent understanding of the disclosure. Accordingly, it should be apparent to those skilled in the art that the following description of embodiments is provided for illustration purpose only and not for the purpose of limiting the inventive concept as defined by the appended claims and their equivalents.

As used herein, the singular terms include the plural reference unless the context clearly indicates otherwise. The terms "comprises" and/or "comprising" specify the presence of stated components, steps, operations, and/or elements, but do not preclude the presence or addition of one or more other components, steps, operations, and/or elements.

FIG. 1 is a block diagram of an obstacle map generating apparatus according to an embodiment.

Figure 2:
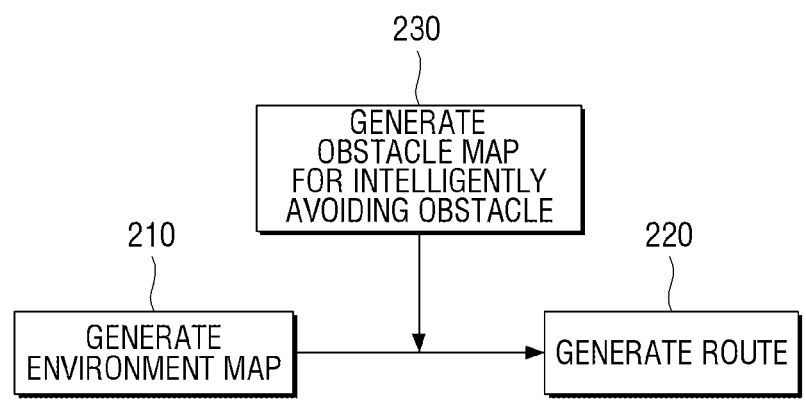
FIG. 2 is a block diagram illustrating how to generate and use an obstacle map.

Referring to FIG. 1, an obstacle map generating apparatus 100 generates an obstacle map which is used by a mobile platform to generate a route based on its surroundings. That is, referring to FIG. 2, once an environment map for the surroundings of the mobile platform is generated (210), a route is created (220), and an obstacle map for intelligently avoiding an obstacle is generated (230) before the generation of the route (220).

To generate the obstacle map, the obstacle map generating apparatus 100 includes a receiver 110, a memory 120, and one or more processors 130.

The receiver 110 receives an environment map which is used to generate an obstacle map.

Figures 3, 4A, 4B, 4C, 4D:
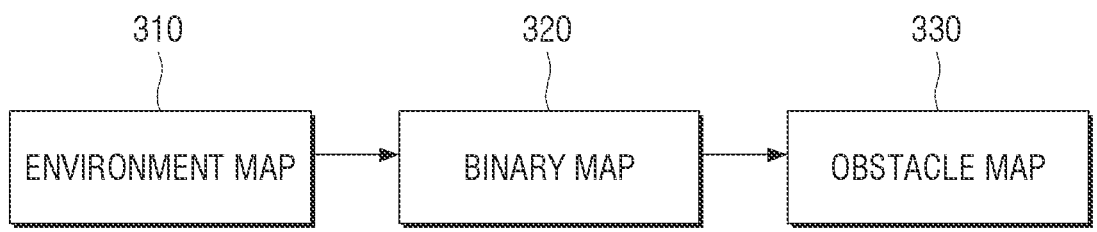
FIG. 3 is a block diagram illustrating how to generate an obstacle map.
FIGS. 4A-4D and 5A-5D illustrate how to generate an obstacle map.

Referring to FIG. 3, an obstacle map 330 is generated by generating a binary map 320 from an environment map 310 and applying an obstacle expansion model to the binary map 320.

Here, the environment map refers to a map which includes information about the surroundings of a mobile platform. The information includes probability information about an obstacle. The environment map may be generated by analyzing images captured by an image pickup device attached to the mobile platform and/or by using information generated by detection sensors such as distance measuring sensors.

The memory 120 stores an obstacle map generating program which generates an obstacle map from the environment map received by the receiver 110.

The processors 130 generates an obstacle map by executing the obstacle map generating program.

An obstacle map is generated by generating a binary map based on obstacle information obtained from the environment map and applying an obstacle expansion model to the binary map. As already mentioned above, the environment map includes obstacle information such as obstacle probability information, and the binary map is generated using the obstacle information. The binary map is a map showing a cost value of 0 or 1. The binary map includes a plurality of cells in a grid which represent a probability of presence of an obstacle in each grid cell as a value of 0 or 1, or any equivalent value.

If the environment map is generated as a grid of cells and the probability of presence of the obstacle differs from one grid cell to another grid cell, a value of 1 is applied to grid cells having an obstacle presence probability higher than, or equal to, a reference value, and a value of 0 is applied to grid cells having an obstacle presence probability lower than the reference cell.

Alternatively, if the environment map is not generated as a grid of cells or if the size of the grid cells of the environment map differs from the size of the grid cells of the binary map, a value of 0 or 1 may be applied by comparing an average of the obstacle presence probabilities at multiple positions corresponding to a grid cell of the binary map with the reference value. Still alternatively, a value of 0 or 1 may be applied by comparing an weighted average or the maximum of the obstacle presence probabilities at multiple positions corresponding to a grid cell of the binary map with the reference value. Since the obstacle cost is expanded when generating an obstacle map, the reference value may be set to have a small margin for the obstacle. That is, a value of 1 may be applied only to positions where the obstacle is highly likely to exist. The reference value may be 0.5 or may vary depending on a size or sensitivity of the mobile platform, a danger level of the obstacle, or a user setting. Also, the binary map may be generated by classifying the obstacle cost as 0 or 1 in various manners.

The reference value may be set by a user or may vary depending on the obstacle or the. When the reference value is set or changed by the user, an avoidance tendency for the obstacle or the environment may be stored. That is, a pattern of remote driving and the user's driving behavior for each obstacle or environment may be stored and may be used later. The pattern of remote driving and the user's driving behavior can be learned through machine learning. Such information learned through machine learning may be used later to generate an obstacle map for a similar or new obstacle or environment.

An obstacle map is generated by applying an obstacle expansion model to the binary map. Specifically, an obstacle map is generated by expanding the obstacle presence probability cost from each grid cell of the binary map where the obstacle exists to its neighboring grid cells. Since in the binary map, the obstacle cost is set only to a value of 0 or 1, the binary map may be imprecise. Thus, when generating a moving route for the mobile platform, the mobile platform may pass by too close to the obstacle. For this reason, the binary map is not readily used to generate a route, but an obstacle map is generated by applying the obstacle expansion model to the binary map.

The obstacle expansion model is a model that gradually decreases the obstacle cost in a direction away from a grid cell of the binary map set to a value of 1. That is, the closer each grid cell of the binary map is to the obstacle, the closer the obstacle cost of each grid cell of the binary map becomes to 1, the further each grid cell of the binary map is away from the obstacle, the closer the obstacle cost of each grid cell of the binary map becomes to 0, and the obstacle cost of each grid cell of the binary map gradually decreases in a direction away from the grid cells set to a value of 1.

The obstacle expansion model may be a model using at least one of a sigmoid function, a linear function, and a Gaussian function. The pattern in which the obstacle expansion model decreases the obstacle cost may vary depending on environment in which each route is generated, importance of a task performed by the mobile platform, and a danger level of the obstacle. The obstacle cost may linearly decrease or may decrease in the form of at least one of a sigmoid function, linear function, and a Gaussian function.

The degree of the obstacle expansion model may vary. The number of grid cells to which the obstacle expansion model is applied starting from the grid cells having a value of 1 may vary depending on the size of the obstacle, the danger level of the obstacle, or a user setting.

The application of the obstacle expansion model to the binary map is as illustrated in FIGS. 4A-4D. The obstacle expansion model is applied starting from each grid cell of the binary map with a value of 1. The obstacle expansion model may be applied in the order of FIGS. 4A through 4D. The obstacle cost is expanded starting from each grid cell of the binary map with a value of 1 in a positive X-axis direction from 1 to 0.5 to 0, as illustrated in FIG. 4A, then in a positive Y-axis direction from 1 to 0.5 to 0 and from 0.5 to 0.3 to 0, as illustrated in FIG. 4B, and then in negative X- and Y-axis directions, as illustrated in FIGS. 4C and 4D. In this manner, an obstacle map is generated.

Since an obstacle map is generated by expanding the obstacle cost, precision and stability of generating each route in consideration of the obstacle can be improved.

In a case where the obstacle is not a static obstacle, but a dynamic obstacle that is moving, an appropriate obstacle map for the dynamic obstacle needs to be generated.

In a case where the obstacle is a dynamic obstacle, generation of a binary map may be performed differently than when the obstacle is a static obstacle. Since a dynamic obstacle has motion, i.e., vector information, an obstacle map may be generated using the vector information about the obstacle.

An estimated move area of the obstacle is obtained using the vector information about the obstacle, an estimated time-to-collision with the obstacle is calculated, and a binary map is generated using an estimated move section in the estimated move area of the obstacle at the estimated time-to-collision with the obstacle.

First, the estimated move area of the obstacle is obtained using the vector information about the obstacle. The estimated move area of the obstacle is obtained using dynamic obstacle information received from an environment map or from sensors that have detected the obstacle, such as a current position, a moving direction, and moving speed of the obstacle. The estimated move area of the obstacle may have a sector shape or a fan shape as shown in FIGS. 5B and 5C discussed below depending on motion characteristics of the obstacle. Once the estimated move area of the obstacle is obtained, the estimated time-to-collision with the obstacle is calculated.

By using vector information about the mobile platform that is moving along a route, a determination can be made as to whether the route of the mobile platform overlaps with the route of the obstacle. When the route of the mobile platform overlaps with the route of the obstacle, the mobile platform may collide with the obstacle. Thus, the estimated time-to-collision with the obstacle is calculated.

Once the estimated time-to-collision with the obstacle is calculated, an estimated move section of the obstacle in the estimated move area at the estimated time-to-collision with the obstacle can be identified, and a binary map for the obstacle is generated by applying a value of 1 to the identified estimated move section of the obstacle. That is, a value of 1 may be applied to an estimated position of collision with the obstacle, and a value of 0 may be applied to each position with a low probability of collision with the obstacle.

After the binary map for the dynamic obstacle is generated, an obstacle expansion model is applied to the binary map by using the vector information about the dynamic obstacle considering the estimated move area of the dynamic obstacle, thereby generating an obstacle map. The obstacle map is generated by applying the obstacle expansion model to the binary map for the dynamic obstacle in substantially the same manner as when generating an obstacle map for a static obstacle. However, for the dynamic obstacle, the obstacle expansion model is applied considering the moving direction of the dynamic obstacle, whereas for the static obstacle, the obstacle expansion model is applied simply in X- and Y-axis directions.

Figure 5A:
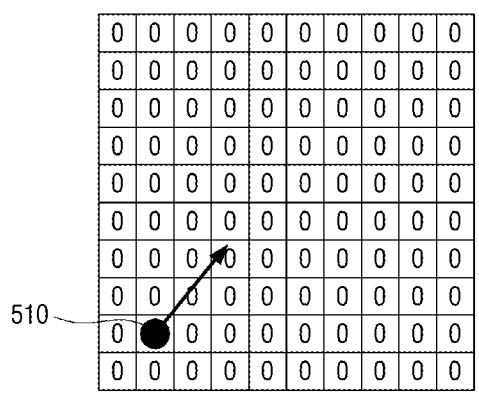
Figure 5B:
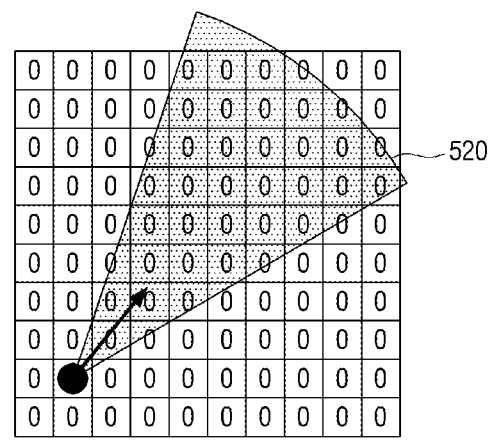
Figure 5C:
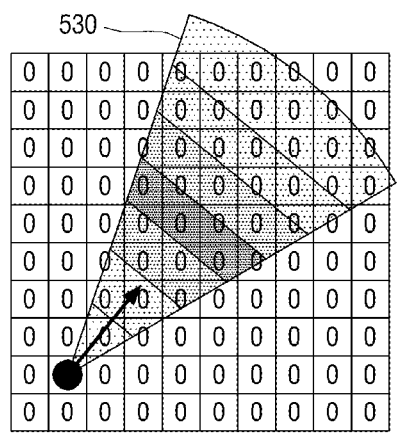
Figure 5D:
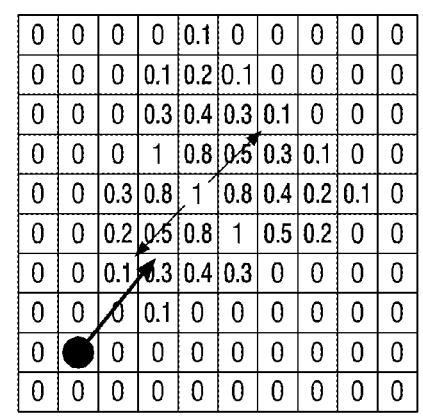

Referring to FIGS. 5A and 5B, an estimated move area 520 of the mobile platform is obtained based on vector information about a dynamic obstacle 510. Referring to FIG. 5C, the estimated move area 520 may be divided into a plurality of estimated move sections according to time, as indicated by reference numeral 530. Thereafter, a binary map is generated using an estimated time-to-collision with the dynamic obstacle 510, and as illustrated in FIG. 5D, an obstacle map is generated by applying an obstacle expansion model to the generated binary map. Since the estimated move sections obtained by dividing the estimated move area 520 may not exactly match grid cells of the generated binary map, the manner in which the obstacle cost is expanded may vary depending on the degree to which the estimated move sections obtained by dividing the estimated move area 520 match grid cells of the generated binary map. Also, the obstacle expansion model may be applied only to grid cells within the estimated move area 520 or within a predetermined distance of the estimated move area 520. Obstacle costs of estimated move sections of the dynamic obstacle 510 that correspond to the same time, particularly, grid cells corresponding to these estimated move sections, may be set to the same value. That is, when the obstacle expansion model is applied to the binary map, obstacle costs of sections where the obstacle is estimated to arrive or pass at the same time are given the same value.

Figure 6:
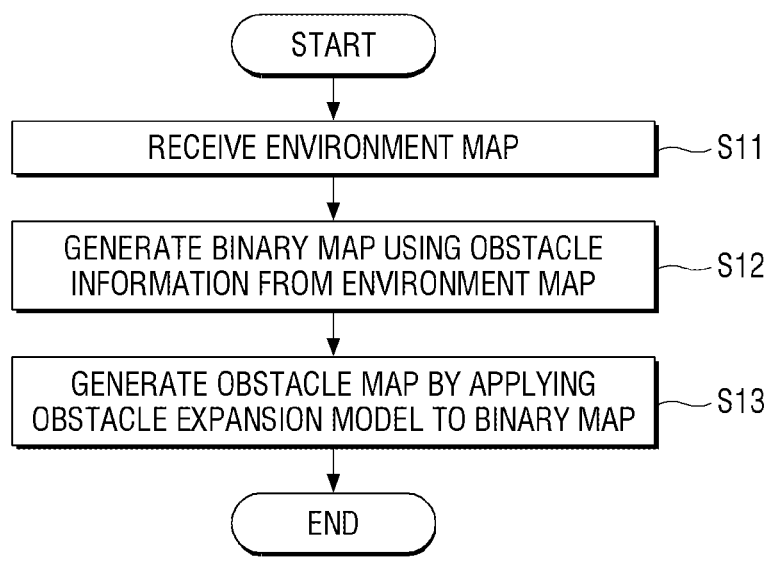
FIG. 6 is a flowchart illustrating an obstacle map generating method according to an embodiment of the present disclosure.
Figure 7:
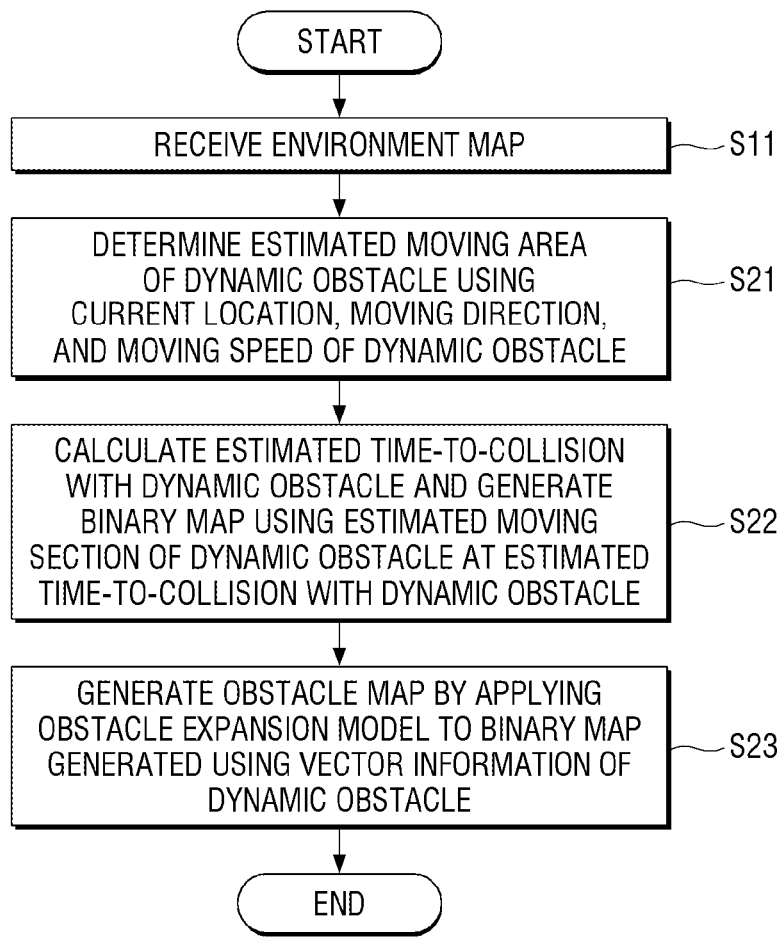
FIGS. 7 and 8 are flowcharts illustrating obstacle map generating methods according to other embodiments of the present disclosure.
Figure 8:
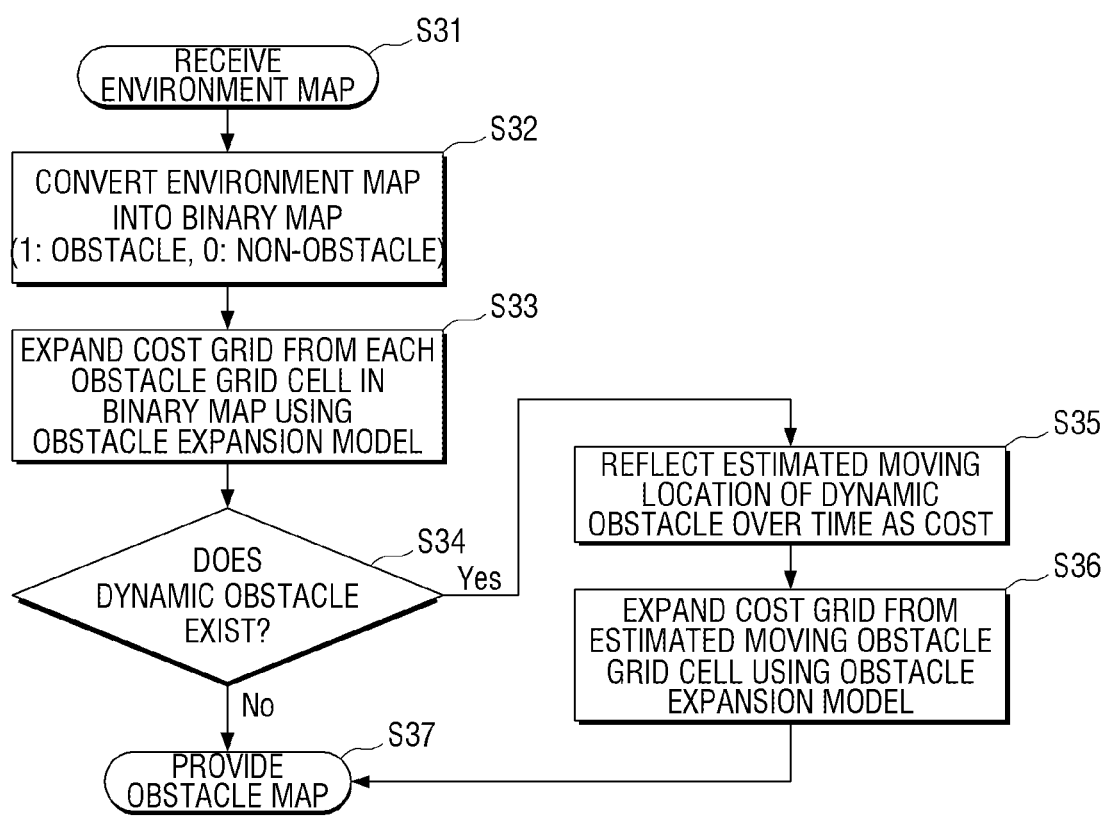

FIG. 6 is a flowchart illustrating an obstacle map generating method according to an embodiment, and FIGS. 7 and 8 are flowcharts illustrating obstacle map generating methods according to other embodiments. The obstacle map generating methods of FIGS. 6 through 8 may be implemented by the obstacle map generating apparatus of FIG. 1 described above, and thus, steps of the obstacle map generating methods of FIGS. 6 through 8 will hereinafter be described briefly.

Referring to FIG. 6, in S11, an environment map is received, and in S12, a binary map is generated using obstacle information obtained from the environment map. The binary map may be generated by dividing the environment map into grid cells and setting the obstacle presence probability cost of each of the grid cells to a value of 0 or 1, or an equivalent value, based on the probability of presence of an obstacle in each of the grid cells. The obstacle cost of grid cells having an obstacle presence probability higher than, or equal to, a reference value may be set to a value of 1, and the obstacle cost of grid cells having an obstacle presence probability lower than the reference value may be set to a value of 0.

Thereafter, in S13, an obstacle map is generated by applying an obstacle expansion model to the binary map. The obstacle map is generated by expanding the obstacle presence probability cost from a grid cell of the binary map where an obstacle exists to its neighboring grid cells.

The obstacle expansion model, which is a model that gradually decreases the obstacle presence probability cost in a direction away from the grid cells set to a value of 1, may use at least one of a sigmoid function, a linear function, and a Gaussian function.

Referring to FIG. 7, in S21, if there exists a dynamic obstacle, an estimated move area of the dynamic obstacle is obtained using at least one of a current position, a moving direction, and moving speed of the dynamic obstacle, and in S22, an estimated time-to-collision with the dynamic obstacle is calculated, and a binary map is generated using an estimated move section of the dynamic obstacle in the estimated move area at the estimated time-to-collision with the dynamic obstacle. The binary map is generated by applying an obstacle expansion model considering the estimated move area of the dynamic obstacle, and obstacle costs of estimated move sections of the dynamic obstacle that correspond to the same time, particularly, grid cells corresponding to these estimated move sections, may be set to the same value.

Referring to FIG. 8, in S31, in a case where there exist both a static obstacle and a dynamic obstacle, an environment map is received, in S32, the environment map is converted into a binary map, and in S33, a cost grid is expanded by applying an obstacle expansion model starting from each obstacle grid cell in the binary map. Thereafter, in S34, a determination is made as to whether there exists a dynamic obstacle. If it is determined that there exists a dynamic obstacle in S34, an estimated move position of the dynamic obstacle is reflected as cost in S35, and in S36, the cost grid is expanded by using the obstacle expansion model starting from grid cells corresponding to an estimated move section of the dynamic obstacle. In this manner, in S37, an obstacle map is generated and provided. However, if it is determined that there does not exist a dynamic obstacle in S34, an obstacle map is generated and provided in S37 as a result of S33.

Figure 9A:
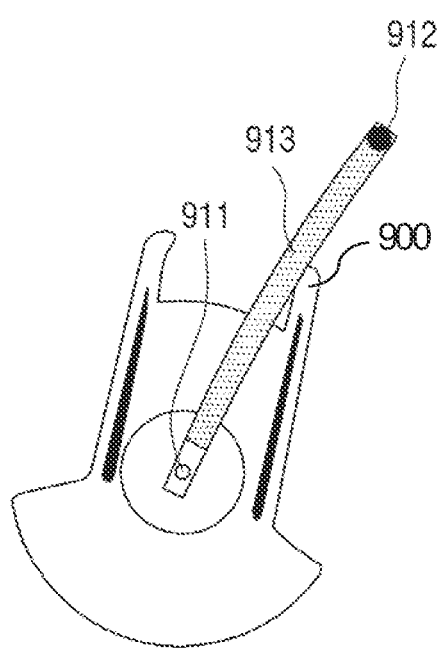
FIGS. 9A and 9B compare an obstacle map generated by an obstacle map generating method according to an embodiment with an obstacle map generated by a related-art obstacle map generating method.
Figure 9B:
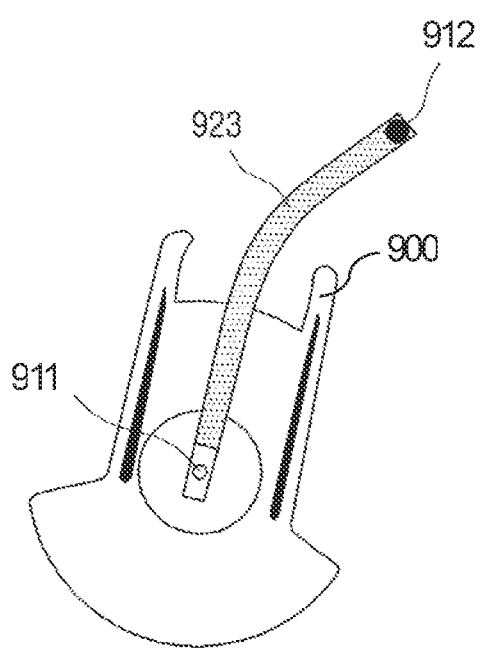

Referring to FIG. 9A, in the case of not using an obstacle map to create a route, a route 913 for a mobile platform 911 to take to reach a destination 912 may be created too close to an obstacle 900. On the other hand, referring to FIG. 9B, in the case of creating a route according to the above-described embodiments of the present disclosure, a route 923 for the mobile platform 911 to take to reach the destination 912 can be created stably at a distance from the obstacle 900.

The above-described embodiments of the inventive concept may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of the transitory computer-readable media include magnetic media such as hard disks, floppy disks, and magnetic tape; optical media such as CD ROM disks and DVDs; magneto-optical media such as floptical discs; and hardware devices that are specially configured to store and perform program instructions, such as read-only memory (ROM), random access memory (RAM), flash memory, and the like. Examples of the non-transitory computer-readable media also include carrier waves (e.g., transmissions over the Internet). The computer-readable media may be distributed over computer systems connected via a network, and computer-readable code may be stored or executed in the computer-readable media. Functional programs, codes, and code segments for implementing the above-described embodiments of the present disclosure can be easily inferred by programmers skilled in the art to which the present disclosure pertains. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While embodiments are described above, it is not intended that these embodiments describe all possible forms of the inventive concept. Rather, the words used in the specification are words of description rather than limitation, and it is understood that various changes may be made without departing from the spirit and scope of the inventive concept. Additionally, the features of various implementing embodiments may be combined to form further embodiments of the inventive concept.

What is claimed is:

1. A method for generating and utilizing an obstacle map, the method comprising:
   receiving an environment map comprising a first plurality of grid cells in which presence of an obstacle is represented by probabilities;
   generating a binary map comprising a second plurality of grid cells in which a position of the obstacle is indicated by a binary value of an obstacle cost, based on obstacle information including the probabilities of presence of the obstacle in the environment map;

generating an obstacle map by applying an obstacle expansion model to the binary map;

generating a route along which a mobile platform is to be driven based on the obstacle map; and driving the mobile platform autonomously along the route, wherein the applying of the obstacle expansion model comprises setting a plurality of obstacle costs of a plurality of neighboring positions of the position of the obstacle in the binary map to a plurality of values, respectively.

2. The method of claim 1, wherein the generating of the binary map comprises:

setting an obstacle cost of each of the second plurality of grid cells, corresponding to a probability of presence of the obstacle at each of the second plurality of grid cells, to a value of 0 or 1, or an equivalent value.

3. The method of claim 2, wherein the generating of the binary map further comprises:

setting an obstacle cost of a first grid cell, among the second plurality of grid cells, having a probability of presence of the obstacle higher than or equal to a reference value to the value of 1; and setting an obstacle cost of a second grid cell, among the second plurality of grid cells, having a probability of presence of the obstacle lower than the reference value to the value of 0.

4. The method of claim 3, wherein the obstacle cost of the first or second grid cell corresponds to an average of the probabilities of presence of the obstacle at multiple positions corresponding to the first or second grid cell, a weighted probability of presence of the obstacle at the first or second grid cell, or a maximum probability of presence of the obstacle at the first or second grid cell, respectively.

5. The method of claim 3, wherein the reference value is set to be different according to at least one of a size of a mobile platform to avoid the obstacle using the obstacle map, a sensitivity of the mobile platform, and a danger level of the obstacle.

6. The method of claim 3, wherein the obstacle cost of the first or second grid cell corresponds to an average of probabilities of presence of the obstacle at multiple positions corresponding to the first or second grid cell, or a weighted probability of presence of the obstacle at the first or second grid cell, respectively.

7. The method of claim 2, wherein the setting of the obstacle costs of the neighboring positions to the values comprises gradually decreasing the obstacle cost of each of the second plurality of grid cells in a direction away from a grid cell, among the second plurality of grid cells, where an obstacle cost is set to the value of 1, in the binary map.

8. The method of claim 1, wherein the generating of the binary map comprises, based on the obstacle being a dynamic obstacle which is moving, generating the binary map using vector information about the dynamic obstacle.

9. The method of claim 8, wherein the generating of the binary map further comprises:

obtaining an estimated move area of the dynamic obstacle using at least one of a current position, a moving direction, and moving speed of the dynamic obstacle;

calculating an estimated time-to-collision of the mobile platform with the dynamic obstacle; and generating the binary map using an estimated move section, in the estimated move area, of the dynamic obstacle at the estimated time-to-collision with the dynamic obstacle, wherein the estimated move area takes a fan shape with an angle based on the current position of the dynamic obstacle.

10. The method of claim 9, wherein the generating of the obstacle map comprises generating the obstacle map by applying the obstacle expansion model to the binary map in consideration of the estimated move area of the dynamic obstacle.

11. The method of claim 10, wherein the generating of the obstacle map further comprises setting obstacle costs of a plurality of estimated move sections, in the estimated move area, of the dynamic obstacle that correspond to a same time, to a same value.

12. A method of generating and utilizing an obstacle map, the method comprising:

receiving an environment map comprising a first plurality of grid cells in which presence of an obstacle is represented by probabilities;

generating a binary map comprising a second plurality of grid cells indicating a position of the obstacle by a binary value of an obstacle cost, based on obstacle information including the probabilities of presence of the obstacle in the environment map;

generating an obstacle map by setting a plurality of obstacle costs of a plurality of neighboring positions of the position of the obstacle in the binary map to a plurality of values, respectively, which change from a predetermined value set to the obstacle cost of the position of the obstacle according to a distance from the position of the obstacle;

generating a route along which a mobile platform is to be driven based on the obstacle map; and driving the mobile platform autonomously along the route.

13. The method of claim 12, wherein the respective values decrease from the predetermined value according to the distance from the position of the obstacle, and wherein the respective values indicate the probabilities of presence of the obstacle at the neighboring positions are greater than 0.

14. The method of claim 13, wherein at least one of a number and a pattern of the neighboring positions, where the obstacle costs are set to the respective values, is determined based on at least one of a size and a danger level of the obstacle.

15. The method of claim 12, wherein based on the obstacle being a dynamic obstacle which is moving, the neighboring positions, where the obstacle costs are set to the respective values, change in the obstacle map according to a moving direction of the obstacle.

16. An obstacle map generating apparatus comprising:

a receiver configured to receive an environment map comprising a first plurality of grid cells in which presence of an obstacle is represented by probabilities;

a memory configured to store an obstacle map generating program which generates an obstacle map from the environment map; and at least one processor configured to execute the obstacle map generating program, generate a route along which a mobile platform is to be driven based on the obstacle map, and provide the route to the mobile platform so that the mobile platform is to be autonomously driven along the route, wherein the obstacle map generating program is configured to generate a binary map comprising a second plurality of grid cells in which a position of the obstacle is indicated by a binary value of an obstacle cost, based on obstacle information including the probabilities of presence of the obstacle in the environment map, and generate an obstacle map by applying an obstacle expansion model to the binary map, and wherein the obstacle expansion model is applied such that a plurality of obstacle costs of a plurality of neighboring positions of the position of the obstacle in the binary map are set to a plurality of values, respectively.

17. The apparatus of claim 16, wherein the obstacle map generating program is configured to generate the binary map by:

setting an obstacle cost of a first grid cell, among the second plurality of grid cells, having a probability of presence of the obstacle higher than or equal to a reference value to a value of 1; and setting an obstacle cost of a second grid cell, among the second plurality of grid cells, having a probability of presence of the obstacle lower than the reference value to a value of 0.

18. The apparatus of claim 17, wherein the setting of the obstacle costs of the neighboring positions comprises gradually decreasing an obstacle cost of each of the second plurality of grid cells in a direction away from the first grid cell where the obstacle cost is set to the value of 1, in the binary map.

19. The apparatus of claim 16, wherein the obstacle map generating program is further configured, based on the obstacle being a dynamic obstacle, to:

obtain an estimated move area of the dynamic obstacle using vector information about the dynamic obstacle;

calculate an estimated time-to-collision of the mobile platform with the dynamic obstacle; and generate the binary map using an estimated move section, in the estimated move area, of the dynamic obstacle at the estimated time-to-collision with the dynamic obstacle, wherein the estimated move area takes a fan shape with an angle based on the current position of the dynamic obstacle.

20. The apparatus of claim 19, wherein the obstacle map generating program is further configured to generate the obstacle map by applying the obstacle expansion model to the binary map in consideration of the estimated move area of the dynamic obstacle.

* * * * *